| (12) | United States Patent | (10) Patent No.: | US 8,068,478 B2 |
|---|---|---|---|
| | Cruz | (45) Date of Patent: | Nov. 29, 2011 |

(54) RESOURCE SHARING BROADBAND ACCESS SYSTEM, METHODS, AND DEVICES

(75) Inventor: Rene L. Cruz, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1242 days.

(21) Appl. No.: 10/582,435

(22) PCT Filed: Dec. 17, 2004

(86) PCT No.: PCT/US2004/042696
§ 371 (c)(1),
(2), (4) Date: Jun. 9, 2006

(87) PCT Pub. No.: WO2005/064857
PCT Pub. Date: Jul. 14, 2005

(65) Prior Publication Data
US 2007/0160030 A1    Jul. 12, 2007

Related U.S. Application Data

(60) Provisional application No. 60/531,475, filed on Dec. 19, 2003.

(51) Int. Cl.
*H04L 12/28* (2006.01)
*H04L 12/43* (2006.01)
*G06F 15/16* (2006.01)
(52) U.S. Cl. ......... 370/351; 370/395; 370/461; 709/227
(58) Field of Classification Search .......... 709/220–227, 709/228, 229, 217–219, 223–229; 370/395.2, 370/389, 328–352, 468–493, 431–465; 455/414–455
See application file for complete search history.

(56) References Cited

U.S. PATENT DOCUMENTS

| 5,941,988 | A  | * | 8/1999 | Bhagwat et al. ............... 726/12 |
| 6,119,162 | A  | * | 9/2000 | Li et al. ......................... 709/227 |
| 6,870,848 | B1 | * | 3/2005 | Prokop ....................... 370/395.2 |
| 6,954,616 | B2 |   | 10/2005 | Liang et al. |
| 7,032,009 | B2 | * | 4/2006 | Dowling ...................... 709/217 |
| 7,113,771 | B2 | * | 9/2006 | Kotzin ...................... 455/414.1 |
| 7,292,560 | B2 | * | 11/2007 | Lou et al. ..................... 370/338 |

(Continued)

FOREIGN PATENT DOCUMENTS
WO    WO 00 19327    4/2000

(Continued)

OTHER PUBLICATIONS

"Broadband Services in the United States: An Analysis of Availability and Demand," prepared by the Florida Public Service Commission, Oct. 2002.

*Primary Examiner* — Man Phan
(74) *Attorney, Agent, or Firm* — Greer, Burns & Crain Ltd.

(57) ABSTRACT

Methods, systems and devices for sharing communication resources among a plurality of clients (200-204) that are part of a common wireless community (1000). The communication resources are, for example, Internet access resources (101-104). Another example, might be a video or data delivery communication resource. As an example, clients have separate Internet access accounts. Embodiments of the invention, for example, allow client business units or residential units to share separate Internet access accounts.

20 Claims, 2 Drawing Sheets

U.S. PATENT DOCUMENTS

| | | |
|---|---|---|
| 7,525,937 B2 * | 4/2009 | O'Neill .................... 370/328 |
| 7,529,229 B1 * | 5/2009 | Norrell et al. ............ 370/352 |
| 2002/0002618 A1 * | 1/2002 | Vange ....................... 709/228 |
| 2002/0051425 A1 | 5/2002 | Larsson |
| 2002/0163929 A1 | 11/2002 | Li et al. |
| 2002/0193133 A1 | 12/2002 | Shibutani |
| 2003/0157900 A1 | 8/2003 | Gaal et al. |
| 2003/0191856 A1 | 10/2003 | Lewis et al. |
| 2003/0202491 A1 | 10/2003 | Tiedemann, Jr. et al. |
| 2003/0204615 A1 | 10/2003 | Wei et al. |
| 2005/0025182 A1 | 2/2005 | Nazari |
| 2005/0030907 A1 | 2/2005 | Lou et al. |
| 2005/0041650 A1 | 2/2005 | O'Neill |
| 2005/0195841 A1 | 9/2005 | Dowling |
| 2006/0116075 A1 | 6/2006 | Gallo |
| 2006/0140147 A1 * | 6/2006 | Van Bemmel ............ 370/329 |
| 2006/0193310 A1 * | 8/2006 | Landry et al. ............ 370/356 |
| 2006/0203841 A1 * | 9/2006 | Fischer .................... 370/461 |
| 2007/0036170 A1 * | 2/2007 | Gonikberg et al. ....... 370/431 |

FOREIGN PATENT DOCUMENTS

WO  WO 2004/070970  8/2004

* cited by examiner

RESOURCE SHARING BROADBAND ACCESS SYSTEM, METHODS, AND DEVICES

PRIORITY CLAIM

Applicant claims priority benefits under 35 U.S.C. §119 on the basis of Patent Application No. 60/531,475, filed Dec. 19, 2003.

TECHNICAL FIELD

A field of the invention is network communications, including Internet and intranet communications. The invention concerns network access resource sharing among a plurality of clients within a common wireless community network.

BACKGROUND OF THE INVENTION

Dial-up service is a common method of Internet access. Dial-up service uses a dial-up modem through which a computer makes phone calls to an Internet service provider. The dial-up modem transforms digital data from the personal computer into an analog signal for transmission through a phone line, and conversely converts incoming analog signals into digital data for the personal computer. Dial-up service is known to be slow. For example, viewing web pages with multimedia content, such as graphical images, is often unacceptably slow.

Broadband access addresses this problem by providing higher digital data rates than dial-up service. A "DSL" (Digital Subscriber Line) involves upgrading the dial-up modem to a higher speed modem, known as a DSL modem, as well as using an upgraded modem device at the Internet Service Provider (ISP) premises, also known as the "central office." The DSL approach uses existing copper wire, possibly upgraded along certain segments to increase its capacity to carry digitized information. Often the DSL access line is a spare telephone line that is already connected to the client location, such as a business or a residential unit, and the central office is owned and operated by the local telephone company. The data rates achievable by DSL are dependent on the distance between the client location and the central office, and range roughly between 100 kbps-1500 kbps. A DSL connection is commonly called a broadband access line. There are many client locations, e.g., residential units, that are too far away from a central office to have DSL service available.

Another broadband access scheme most commonly used with residential clients makes use of the coaxial cable that passes through a residential unit, for purposes of providing television signals to the home, "Cable TV". A specialized modem, called a cable modem, is attached the coaxial cable inside the residential unit. The cable modem facilitates digital communication between the residential unit and facilities owned by the cable TV operator (often called a "Multiple Services Operator" (MSO)). The MSO is attached to the Internet, and thus becomes an Internet service provider for the residential unit. The coaxial cable entering a residential unit is typically shared with other residential units in close geographic proximity. Peak data rates on the order of approximately 2 million bits per second (Mbps) are possible with cable modems, with current service offerings.

DISCLOSURE OF INVENTION

Methods, systems and devices for sharing communication resources among a plurality of clients that are part of a common wireless community. The communication resources are, for example, Internet access resources. Another example, might be a video or data delivery communication resource. As an example, clients have separate Internet access accounts. Embodiments of the invention, for example, allow client business units or residential units to share separate Internet access accounts.

DETAILED DESCRIPTION

Figure 1:
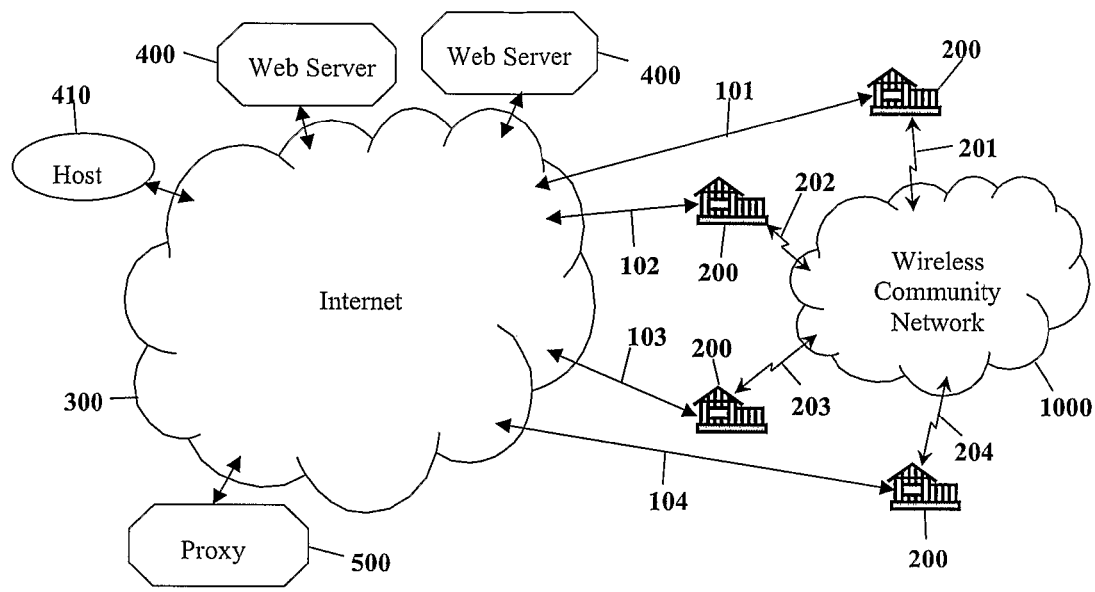
FIG. 1 is a block diagram of a residential broadband access system in accordance with an embodiment of the invention.

The invention concerns methods, systems and devices for sharing communication resources among a plurality of clients that are part of a common wireless community. The communication resources are, for example, Internet access resources. Another example, might be a video or data delivery communication resource. As an example, clients have separate Internet access accounts. Embodiments of the invention, for example, allow client business units or residential units to share separate Internet access accounts.

The wireless community network is used to share individual network access resources available at one or more of the clients. In preferred embodiments, the network access is Internet access, and one or more clients in a common wireless community, e.g. a wireless area network such as an IEEE 802.11b network, provides an Internet connection. Among the clients in the common wireless community, there are likely to be a plurality of Internet connections. For example, in a particular wireless community, there may be a number of clients with DSL connections, a number of clients with Cable connections, and a number of clients with slow dial-up connections. The combined resources are made available for network communications in clients in the wireless community.

In preferred embodiments, clients in the wireless community, for example through software or modems, are configured to act as a local proxy to facilitate a client's communication with a proxy server instead of network resource. In some cases, a proxy server may be implemented in a client device in the wireless community or server device placed in the wireless community for the purpose of implementing a proxy server. In other cases, a proxy server may be accessed through the network, for example the Internet. In either case, based upon traffic patterns or other information about usage of the Internet connections in the wireless community, the proxy protocol directs client packets to Internet connection resources available in the wireless network such that some or all of the Internet connection resources are shared among clients in the wireless community. The proxy server appends information necessary for packet routing to and from clients, and establishes a communication session with a network resource, e.g. a server on the Internet, on behalf of clients in the wireless community.

Embodiments of the invention provide, for example, a shared access broadband access system serving a plurality of geographically co-located clients, e.g., residences. Individual clients in a wireless community of clients have a wired network access line, which could be either a narrowband access line or a broadband access line. The access system exploits these network access line resources, as well as a wireless communication medium that interconnects the clients. The wireless communication medium, for example a wireless area network, facilitates the pooling together of the wired access lines, and clients connected to the wireless area network then share the pooled access lines. Clients are thereby provided with an access medium that has a larger capacity to transport bursts of data than that provided by the wired access line of a single client. Clients in the wireless area network are provided with shared access broadband access, without requiring each residential unit to have a dedicated broadband access line. The performance of existing wired broadband access lines can also be significantly improved with this invention.

In preferred embodiments of the invention, clients are residential units, such as houses or apartments. A high percentage of the units have a form of wired Internet access. In some preferred embodiments, each client has a wired Internet connection. However, methods and systems of the invention are fault tolerant to the loss of one or more client wired access connections. In some embodiments, a server may be part of the client wireless community, for example to act as a proxy server and/or provide a baseline level of wired network access by one or more broadband connections. This baseline connection to the wired network is then enhanced by client wired access resources when such resources are available through the wireless community.

The wireless community may be established and exist through implementation, for example, of prevailing standards for wireless area networks. In a preferred embodiment, the wireless community is established in accordance with one of the standards of 802.11a, 802.11b or 802.11g. More generally, the wireless community may be implemented with any protocol that permits clients in the community to route packets from local proxies to a proxy server in or apart from the wireless community. Clients are generally geographically located within the limits of the wireless community. Thus, the wireless medium and protocol used to establish the wireless community defines the geographic boundaries of a client wireless community. Typically, and in preferred embodiments, this will be a close geographical arrangement, such as within a business park, in an office building or group of buildings with a number of business units (e.g., different firms or companies), or in neighborhood of residential units.

Embodiments of the invention include devices or software resident within or connected to a client for providing Internet access within a client. The device or software implements a protocol to communicate with other like devices or software resident within or connected to other clients that are part of a common wireless community, where some of the other clients have an Internet connection. The device or software is able to identify packets from different sessions, and can assign sessions to clients with an Internet connection. The software directs packets transmitted from clients over one or more Internet connections in the common wireless community, and forwards packets received from an Internet connection and belonging to a session to the client with an Internet connection, using said protocol. In a preferred embodiment, the device or software is implemented in a DSL modem, and in other exemplary embodiments it is implemented in a wireless access point, a router, a switch, a cable modem, or a dial-up modem. Encryption may be provided by the device or software to protect client sessions from other clients in the wireless community.

A preferred embodiment method for Internet access includes establishing a wireless community of clients, for example with a wireless network protocol such as 802.11. At least some of the clients in the network of clients have an Internet connection. Packets generated by a client for Internet communications are identified as needing to be redirected through other clients in the wireless community network in order to reach a destination server on the Internet. For each packet identified as needing to be redirected, one of a plurality of client Internet connections is. selected among the client Internet connections in the wireless community. Each packet is then forwarded through the Internet connection selected for the packet. Packets received from a server available on the Internet are directed to an appropriate client in the wireless community according to session information established on behalf of the client.

Preferred embodiments where clients are residential units will now be discussed, while artisans will appreciate broader aspects of the invention from their description. In addition, a residential unit may, for example, include multiple clients (e.g., multiple computers). For simplicity of explanation, in the example, each residential unit will be assumed to have a single client. A residential unit client may exploit the bursty nature of data traffic generated by residential Internet users. In particular, in a local neighborhood of residential units, it is unlikely that all residential unit clients are using their Internet access lines at the same time. The idle capacity of the access line of a residential unit client can be used to support the data transfer requests of an active user in another residential unit. A wireless community, for example a wireless local area network, that interconnects the clients (individual computers, for example) in a local neighborhood facilitates the sharing of the Internet access lines. All of the Internet access lines in a neighborhood network are thus pooled together and shared, creating the capability for a residential unit client to avail itself of the transmission capacity in all Internet access lines of the wireless community if no other residential unit has a need to transfer data at a given time. This will improve the speed of Internet access, for example web browsing, without requiring an upgrade of existing wired access lines to each residential unit, and thus provide for shared access broadband access at low cost. It also provides fault tolerance, as the failure of a particular residential unit client's Internet access line does not cause a road block to Internet access, and in a wireless community with a fair amount of shared Internet access connections is unlikely to have a significant impact on bandwidth available for Internet access including access pressures caused by bursty traffic conditions. Exemplary embodiments of the invention, as applied to a single neighborhood of residential units each having a single client are referred to as an ISP-Unaware embodiment and a Meta-ISP embodiment. An embodiment that is a variation of the Meta-ISP embodiment and may be referred to as an ISP-aware embodiment will also be discussed briefly in the context of the Meta-ISP embodiment.

The embodiments to be discussed leverage a TCP session protocol for the directing of packets to and from clients in a wireless community. There are many existing session-oriented protocols in use in the Internet, such as TCP and RTP, and the embodiments discussed below can operate with any such session-oriented protocol.

Figure 2:
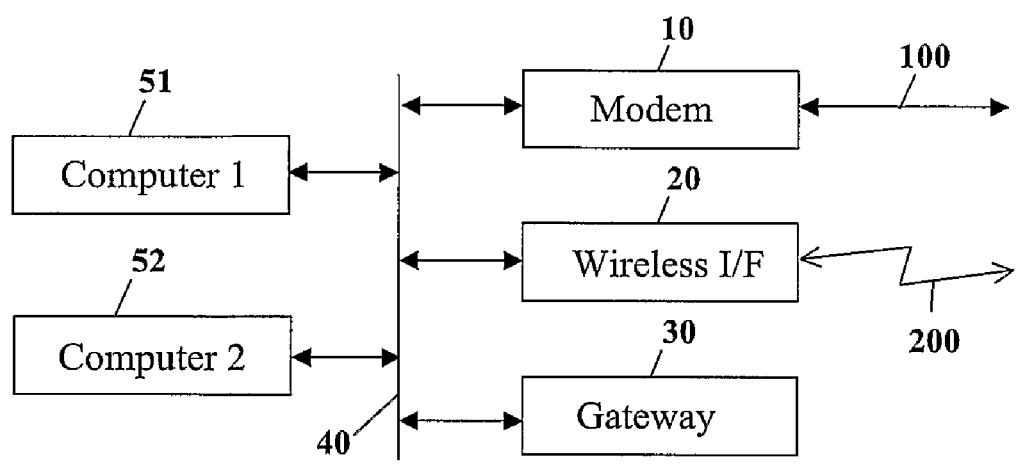
FIG. 2 is a block diagram of a residence system for use with the residential broadband access system of FIG. 1.

Operation of the preferred embodiments will be discussed with respect to an exemplary embodiment residential broadband access system that is shown in FIGS. 1 and 2. In FIG. 1, the access system has a plurality of Internet access lines 101 to 104 with a wireless community 1000 formed by a wireless communication medium and protocol 200 (a set of radio frequency channels, for example). The interne access lines in the FIG. 1 embodiment are within respective residential units 201-204 of the wireless community 1000, and connect to the Internet 300. Also shown are a couple of web servers 401 and 402 that client computers in the residential units 201-204 may communicate with through the Internet access lines 101 to 104 and the Internet 300. For discussing implementation of a meta-ISP embodiment, a proxy server 500 is shown as connected to the Internet for access by proxy servers within the residential units 201-204.

An exemplary residential unit 201-204 is illustrated in FIG. 2. A residential unit may contain one or more personal computers 51, 52, interconnected by a Local Area Network (LAN) 40. A modem 10 provides for communication on a residential access line 100. For example, the residential access line could be a regular telephone line, or a DSL line, and the modem 10 would then be either a dial-up modem or a DSL modem. If the residential access line represents a coaxial cable that also delivers television signals, the modem 10 would be a cable modem. A wireless communication interface 20 conducts communications with the other residential units in the wireless community over a wireless channel or channels 200 that follow a protocol, e.g. IEEE 802.11. The interface 20 may be a Wireless LAN access point, for example. A collection of wireless interfaces implements the wireless community 1000 illustrated in FIG. 1. A gateway 30 controls how the wireless network 1000 is used to enhance the utility of the residential access lines 101-104. The gateway 30 could be a stand-alone hardware device, or could be implemented in software and integrated with the wireless interface 20. Alternatively, a software implementation of a gateway could reside on one of the computers 51 or 52. Indeed, as will be clear to those skilled in the art, the modem 10, wireless interface 20, and the gateway 30 can be integrated into one of the computers 51 or 52.

A residential unit 201-204 can represent a house or a unit in an apartment or condominium complex. However, as has been discussed above, the invention also applies to other clients, such as places of business that use dial-up lines, DSL, or cable modems for access to the Internet.

The web servers 401, 402 and the host 410 represent devices computers inside residential units 201-204 communicate with. For example, when a user browses the web on a computer, web pages are displayed. The web pages contain objects that reside on web servers 401-402. As another example, a user inside a residential unit may wish to transfer a computer file to or from a remote host 410. The wireless community network (WCN) 1000 is thus used to enhance the performance of the residential access lines 101-104. In additional embodiments, a substitute medium and protocol is used in place of the wireless communication medium Example substitute mediums include communications over power lines or using line-of-sight optical links. "HomePlug" is an evolving industry standard (http://www.homeplug.org/), and it provides a substitute medium and protocol for forming a client community in additional preferred embodiments.

ISP-Unaware

In the ISP-Unaware embodiment, traffic is split across the access lines of the wireless community 1000 formed in a residential neighborhood at the granularity of a TCP session. A wireless communication medium and protocol (e.g., IEEE802.11a/b/g) interconnects gateway devices 30 installed in each residential unit to form the wireless community 1000. The gateway device 30 can be implemented in software inside a user's personal computer, by a separate hardware device, or embedded into a wireless local area network (WLAN) access point, for example. Each gateway device 30 can act as proxy, and all of the proxies in the wireless community 1000 coordinate to share the access lines 101-104 of clients that are part of the wireless community 1000.

A request made from a client computer inside a residential unit 201-204 to initiate a TCP session with a device outside the wireless community, e.g. one of the web servers 401, 402, is redirected by the gateway device 30 acting as a local proxy within the same residential unit to a remote proxy (another gateway device) that resides in another one of the residential units 201-204, through the wireless communication medium 200 and protocol. The remote proxy then makes TCP session requests on behalf of the client computer that originally made the TCP session request. After the session is initiated, data packets from the session that originate at the device outside the wireless community are then transported to the remote proxy. The remote proxy then forwards these data packets via the wireless medium and protocol to the local proxy, which in turn forwards the packets to the client computer that originally initiated the session.

Similarly, after the session is initiated, data packets originating at the client computer that initiated the TCP session are redirected by the local proxy to the remote proxy via the wireless communication medium and protocol. In turn, the remote proxy forwards these session data packets to the device outside the wireless community, e.g., one of the web servers 401, 402, that was the original target of the TCP session request. The gateway devices 30 act as a network of proxies in the neighborhood that performs a load balancing function, attempting to spread the TCP session requests from all residential units so that traffic is divided evenly across all of the access lines 101-104 in the residential units 201-204 of the wireless community. Packets originating from a client computer inside a residential unit that are not recognized as belonging to a session are transported through the Internet access line that terminates at the residential unit, and thus do not need to be transported via the wireless communication network.

Although the ISP-Unaware embodiment offers a potentially dramatic improvement in performance relative to when no sharing of access lines is used, there are two limitations. First, the granularity at which traffic is split across all of the access lines can be rather large because the amount of data transported for each TCP session can be large and unpredictable, thus limiting the capability to reliably spread load evenly across residential access lines. Second, traffic traveling between the Internet and a single residential unit passes through other residential units, raising privacy concerns. To partially address this concern, the proxies may utilize encryption in their joint communications as a way to provide security for communications of clients with respect to other clients in the wireless community. This only partially addresses the privacy concern, since the data that flows across the Internet access resources is often not encrypted at a remote server, and thus is potentially visible in the clear at a plurality of residential units.

Data transfers in packet networks are often facilitated by session-oriented protocols. In particular, to realize communication between two endpoints, a session may first be initiated, whereby both endpoints communicate initially to synchronize state information for functions such as flow control and error control. This initial communication often takes the form of what is called a three-way handshake. Once both endpoints have synchronized state information, the flow of data can then take place. The transfer of session data packets realizes such data flow. Each session data packet is labeled with an identifier that determines the identity of the session. This identifier is typically determined during the initial state synchronization. Once the data transfer is completed, the end points then exchange control messages to terminate the session.

A TCP session, for example, is identified by an IP address and a port number associated with each endpoint. To initiate a session, TCP uses a three-way handshake, whereby special control packets called SYN packets are exchanged, which determine initial sequence numbers used for error recovery and flow control.

Consider a data transfer between a computer 51 and a web server 401 using a session-oriented protocol, which is initiated by the computer 51. With the present invention, such a session may be altered, without modification of the protocols at the endpoints. In particular, the gateway device 30 attached to the local computer 51 acts as a proxy to facilitate the data transfer, as has been discussed generally above. Another proxy, referred to as the remote proxy, also facilitates the data transfer. The remote proxy resides on the gateway device within another residential unit belonging to the same wireless community network 1000. The invention alters the session in the following way. When the local computer 51 first initiates a communication with the web server 401, the local proxy residing inside the local gateway device 30 intercepts the packets associated with this communication and determines that a session initiation is taking place. The local proxy acts in accordance with how the web server would act, hence the name proxy. In particular, instead of the session taking place between the local computer 51 and the web server 401, the session takes place between the local computer 51 and the local proxy 30. In order to facilitate the data transfer, the local proxy selects another proxy, called a remote proxy. The remote proxy resides in the gateway device 30 inside another residential unit belonging to the same wireless community network 1000. The selection of the residential unit that contains the remote proxy, among all of the residential units 201-204 belonging to the wireless community network 1000, can be made on the basis of the state of the wireless community network 1000, past selection decisions, as well as on the basis of the pattern of recent activity on the residential access lines 101-104. For example, the proxies may exchange state information on the wireless community network and the residential access lines, and use this state information to form the basis for a selection decision. In an exemplary embodiment, a round robin approach is used for selection, and this and other scheduling algorithms may be used.

After local proxy implemented by a gateway 30 intercepts the packet associated with the session initiation by the local computer 51, the local proxy initiates a session with the remote proxy implemented by another gateway device in the wireless community network 1000. This session takes place via the wireless community medium and protocol 200. In turn, the remote proxy initiates a session with the web server 401, via the residential access line (one of the Internet access lines 101-104) attached to the remote proxy. In effect, the remote proxy communicates directly with the web server 401 instead of the local computer 51.

The remote proxy forwards session data packets from the web server 401 to the local proxy 30 via the wireless community network 1000, which in turn forwards the session data packets to the local computer 51. Similarly, in the other direction, the local proxy 30 forwards session data packets from the local computer 51 to the remote proxy via the wireless community network 1000, which in turn forwards the session data packets to the web server 401.

Artisans will note that the local and remote proxy need not independently generate protocol messages on behalf of the represented entity, and that the session between a local and remote proxy can be virtual. Rather, the local and remote proxies can simply forward session packets after applying an address translation.

Artisans will also note that the remote proxy function is supported on existing networking appliances without any modification. In particular, commercially available wireless access points (e.g. IEEE 802.11 b/g/a—WiFi) commonly perform a Network Address Translation (NAT) function, in order to map local IP addresses to a single IP address. Thus, from the viewpoint of a local wireless proxy, a standard wireless access point with the NAT function can be used as a remote proxy. In this case, the wireless access point might be within a residential unit that does not have a local proxy present, and in this case the sharing of internet access resources is unilateral. Artisans will also note that gateway devices may include memory for temporarily storing packets, for example to implement re-ordering and other functions.

Since some applications and protocols are not session oriented, the local proxy 30 may intercept packets from the local computer 51 which it does not recognize as belonging to any session. In this case the local proxy 30 simply forwards such packets to attached residential access line 100 via the modem 10. Such packets are not transported across the wireless community to another proxy for implementing resource sharing.

Meta-ISP (and ISP Aware)

The Meta-ISP embodiment is similar to the ISP-Unaware embodiment, except that each gateway device 30 acts only as a local proxy. Instead of remote proxies being located at residential units 201-204 throughout the wireless community 1000, a dedicated proxy server 500 acts as proxy server for all residential units 201-204. This proxy server and can be located within or outside the neighborhood, and within or outside the local-ISPs that terminate the residential access lines. In an example embodiment, the proxy server 500 is accessible through the Internet.

A request made from a client computer, e.g., 51, 52 within the wireless community 1000 to initiate a TCP session with a device, e.g., one of the web servers 401, 402, outside the wireless community is redirected by the gateway 30 implementing a local proxy within the same residential unit to the proxy server 500. The proxy server 500 then makes TCP session requests on behalf of the client computer that originally made the TCP session request. After the session is initiated, data packets from the session that originate at the web server 401 or 402 are then transported to the proxy server 500. The proxy server 500 then forwards these data packets to the local proxy implemented by a gateway device, which in turn forwards the packets to the client computer that originally initiated the session. Similarly, after the session is initiated, data packets originating at the client computer that initiated the TCP session are redirected by the local proxy to the proxy server 500. In turn, the proxy server 500 forwards these session data packets to the web server that was the original target of the TCP session request.

The communication between a gateway device 30 implementing a local proxy function and the proxy server 500 can take place by using any of a plurality of Internet access lines in residential units that are within the wireless community, making use of the wireless communication medium and protocol that interconnects the residential units. Traffic can be divided across these residential access lines at the granularity of a packet, and thus the load can be evenly spread across the residential access lines. The decision process for each packet that determines which residential access line will be used to transport the packet can be based on the state of the wireless network, the past history of decisions for other packets, as well as the current state of the residential access lines. The network of local proxies may exchange state information to facilitate this decision process. For example, the local proxies can use such state information to estimate the total load placed on each residential access line, and attempt to distribute load evenly among the residential access lines. The local proxies and the proxy server 500 can also implement packet reordering, to increase the chances that packets will be transported end-to-end in the same order they were originally sent. The packet reordering can be implemented with sequence numbers that are inserted into the packets traveling between the proxy server 500 and the local proxies. In addition, the local proxies and proxy server can provide encryption and decryption to each packet that travels between them, thereby alleviating the privacy concerns discussed earlier. In particular, data flowing across residential access lines as well as between residential units is encrypted, making Internet communications less susceptible to eavesdropping by neighbors. Packets originating from a computer inside a residential unit that are not recognized as belonging to a session are transported through the residential access line that terminates at the residential unit, and thus do not need to be transported via the wireless communication network.

The Meta-ISP embodiment does not require cooperation from a local-ISP that terminates one or more of the residential access lines 101-104. The proxy server 500 may be separate from any local-ISP. However, if all the residential access lines 101-104 are terminated by the same local-ISP, and the local-ISP wishes to cooperate with the sharing of residential access lines pursuant to the invention, then the proxy server can be operated by the local-ISP. This is an ISP-aware variation of the Meta-ISP embodiment.

An example communication will be discussed with respect to the system shown in FIGS. 1 and 2. Consider a data transfer between a computer 51 and a web server 401 using a session-oriented protocol, which is initiated by the computer 51. Such a session may be altered, without modification of the protocols at the endpoints. In particular, the gateway device 30 attached to the local computer 51 acts as a local proxy to facilitate the data transfer. When the local computer 51 first initiates communication with the web server 401, the local proxy intercepts the packets associated with this communication and determines that a session initiation is taking place. The local proxy acts in accordance with how the web server 401 would act. In particular, instead of the session taking place between the local computer 51 and the web server 401, the session takes place between the local computer 51 and the local proxy 30. To facilitate the data transfer, the local proxy 30 communicates with the proxy server 500. The proxy server 500 initiates a session with the web server 401. In effect, the proxy server 500 communicates directly with the web server 401 instead of the local computer 51.

The proxy server 500 forwards session data packets from the web server 401 to the local proxy 30, which in turn forwards the session data packets to the local computer 51. Similarly, in the other direction, the local proxy 30 forwards session data packets from the local computer 51 to the proxy server 500, which in turn forwards the session data packets to the web server 401.

To facilitate communication between the local proxy 30 and the proxy server 500, any of the residential access lines 101-104 may be used, making use of the wireless community network 1000. The selection of which residential access line to use for a particular packet can be made on the basis of the state of the wireless community network 1000 or the pattern of recent traffic on the residential access lines 101-104, for example. Once the selection is made, the packet can be forwarded accordingly. For example, for a packet received from the web server 401, the proxy server 500 can prepend a label to the packet that specifies the gateway device within the residential unit that terminates the selected residential access line. This label can be inserted into the destination address field of a packet whose payload is the packet that is to be transported, for example. The proxy server 500 then forwards the packet to the gateway device associated with the selected residential access line. Upon receiving the packet, the gateway device then strips the label prepended by the proxy server 500 off of the packet. The packet is then forwarded through the wireless interface associated with the gateway device, and delivered to the local proxy via the wireless community network 1000.

For a packet from a local proxy to the proxy server 500, this process is simply reversed. In particular, a residential access line 101-104 is selected as before. The local proxy 30 forwards the packet to the wireless interface 20 for delivery through the wireless community network 1000 to the gateway device associated with the selected residential access line, which in turn forwards the packet to the proxy server 500 via the selected residential access line. The packet is appropriately pre-pended with labels to facilitate forwarding the packet in the manner just described, as will be clear to those skilled in the art. The local proxy and the proxy server 500 can periodically communicate to facilitate the selection of appropriate residential access lines, and therefore spread the traffic load across the residential access lines, in both directions.

In addition, packets sent from the proxy server 500 to the local proxies may be labeled with sequence numbers. The local proxies can use the sequence numbers to determine the order in which they were sent by the proxy server 500, and delay packets appropriately so that they are forwarded to the local computer 51 in the same order that they were sent by the proxy server 500. This packet reordering feature may improve the performance of data transfers substantially, due to the fact that many session-oriented protocols assume that the underlying network usually delivers packets in the same order in which they are sent.

In the reverse direction, packets sent from the local proxy 30 to the proxy server 500 may be labeled with sequence numbers. The proxy server 500 can use the sequence numbers to determine the order in which they were sent by the local proxy 30, and delay packets appropriately so that they are forwarded to the web server 401 in the same order that they were sent by the local computer 51.

To provide privacy, the proxy server 500 may encrypt packets that are sent to a local proxy via the wireless medium and protocol 200. When the packets reach the local proxy 30, the local proxy may decrypt the packets before forwarding them to the local computer 51. In the reverse direction, the local proxy 30 may encrypt the packets that are sent to the proxy server 500. When the packets reach the proxy server 500, the proxy server may decrypt the packets before forwarding them to the web server 401. A degree of privacy is thus achieved between the residential units, since the packets traveling between the residential units 201-204 as well as through the residential access lines are encrypted.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claim

The invention claimed is:

1. A method for providing shared communication resource access, the method comprising steps of:

establishing a network of clients, wherein the clients comprise separate residential units or business units, and wherein at least a plurality of the clients in the network of clients have their own associated communication resource connection;

providing a communication protocol between the network of clients;

providing a protocol for sharing the communication resource connections of the at least some of the clients to the network of clients; and spreading communications from a client in the network of clients among the communication resource connections of the at least a plurality of the clients in the network, wherein the communication resource access comprises Internet access and the communication resource connections of the network of clients comprise Internet access connections, and wherein said steps of providing a protocol for sharing comprises:

accepting client session requests for a session with a device outside of the network of clients; and providing a proxy between the device outside of the network of clients and a client requesting a client session.

2. The method of claim 1, wherein the communication protocol between the network comprises a wireless protocol that is implemented via a wireless medium.

3. The method of claim 2, wherein the network of clients comprises a wireless community.

4. The method of claim 1, wherein said step of spreading comprises choosing one of the Internet access connections based upon usage patterns.

5. The method of claim 1, wherein said step of spreading is conducted on a packet basis.

6. The method of claim 1, wherein said step of spreading is conducted on a session basis.

7. The method of claim 1, wherein said step of providing a proxy is implemented by a device within the network of clients.

8. The method of claim 1, wherein said step of providing a proxy is implemented by the device outside the network of clients.

9. The method of claim 1, wherein said step of providing a proxy is implemented by a device accessed through the Internet.

10. The method of claim 9, wherein said step of providing a proxy is implemented by a device within an Internet service provider that serves the network of clients.

11. The method of claim 1, wherein the communication resource connections of the at least a plurality of clients comprise digital subscriber line (DSL) connections and/or multiple services operator (MSO) connections.

12. A method for providing shared Internet access, the method comprising steps of:

pooling the Internet access connections of a community of clients into a resource available for bursts of traffics to a client in the community of clients by a network medium and protocol shared among the groups of clients, wherein the clients comprise separate residential units or business units; and dividing bursts of traffic to or from a client of the community of clients across the Internet access connections created by said step of pooling, accepting client session requests for a session with a device outside of the community of clients;

providing a proxy between the device outside of the network of clients and a client requesting a client session;

wherein said step of dividing comprises choosing one of the Internet access connections based upon usage patterns.

13. The method of claim 12, wherein said step of choosing is conducted on a packet basis.

14. The method of claim 12, wherein said step of choosing is conducted on a session basis.

15. The method of claim 12, wherein said step of providing a proxy is implemented by a device within the network of clients.

16. The method of claim 12, wherein said step of providing a proxy is implemented by the device outside the community of clients.

17. The method of claim 12, wherein said step of providing a proxy is implemented by a device accessed through the Internet.

18. The method of claim 12, further comprising a step of encrypting communications from a client in the network of clients to protect its communications from other clients in the network of clients.

19. The method of claim 12, wherein one or more clients in the network of clients comprises one or more computers interconnected by a local area network.

20. The method of claim 12, further comprising encrypting the traffic to protect the traffic from other clients in the network of clients.

* * * * *

UNITED STATES PATENT AND TRADEMARK OFFICE
CERTIFICATE OF CORRECTION

| | |
|---|---|
| PATENT NO. | : 8,068,478 B2 |
| APPLICATION NO. | : 10/582435 |
| DATED | : November 29, 2011 |
| INVENTOR(S) | : Rene L. Cruz |

Page 1 of 1

It is certified that error appears in the above-identified patent and that said Letters Patent is hereby corrected as shown below:

In the Specification:

Col. 1, line 52    After "attached", please insert --to--.

Col. 5, line 44    After "medium", please insert --.--.

Col. 8, line 25    After "server", please delete "and".

Col. 10, line 61   Please delete "claim" and insert --claims-- therefor.

Signed and Sealed this
Fifteenth Day of May, 2012

David J. Kappos
*Director of the United States Patent and Trademark Office*